(12) United States Patent
Aharonov et al.

(10) Patent No.: US 10,572,822 B2
(45) Date of Patent: Feb. 25, 2020

(54) MODULAR MEMOIZATION, TRACKING AND TRAIN-DATA MANAGEMENT OF FEATURE EXTRACTION

(71) Applicant: International Business Machines Corporation, Armonk, NY (US)

(72) Inventors: Ranit Aharonov, Tel Aviv (IL); Yaara Goldschmidt, Kiryat Ono (IL); Michal Ozery-Flato, Tel Aviv (IL); Chen Yanover, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 15/215,588

(22) Filed: Jul. 21, 2016

(65) Prior Publication Data

US 2018/0025092 A1 Jan. 25, 2018

(51) Int. Cl.
*G06F 17/30* (2006.01)
*G06N 20/00* (2019.01)
*G06F 16/901* (2019.01)

(52) U.S. Cl.
CPC ......... *G06N 20/00* (2019.01); *G06F 16/9024* (2019.01)

(58) Field of Classification Search
CPC ......... G06F 17/30958; G06F 17/30911; G06F 16/81; G06F 16/9024; G06N 99/005; G06N 5/003; G06N 20/00
USPC ... 707/999.101, E17.127, E17.131, 999.001, 707/999.1, 999.102, 744; 706/62, 15, 25, 706/45, 46, 47, 56, 925
See application file for complete search history.

(56) References Cited

U.S. PATENT DOCUMENTS

| | | | | |
|---|---|---|---|---|
| 7,437,664 B2* | 10/2008 | Borson | ............... | G06F 17/2211 715/209 |
| 8,140,301 B2* | 3/2012 | Abe | ............... | G05B 17/02 703/2 |
| 8,463,591 B1* | 6/2013 | Chang | ............... | G06F 17/271 704/1 |
| 8,996,350 B1* | 3/2015 | Dub | ............... | G06F 17/30011 704/1 |

(Continued)

OTHER PUBLICATIONS

Hongzhi Xu., "Discovery of Dependency Tree Patterns for Relation Extraction", 23rd Pacific Asia Conference on Language, Information and Computation, pp. 851-858, 2009.

*Primary Examiner* — Shiow-Jy Fan
(74) *Attorney, Agent, or Firm* — Dvir Gassner (57) ABSTRACT

There is provided, in accordance with some embodiments, a method for receiving electronic documents representing a dependency graph comprising feature extractors at each graph node and directed edges corresponding to computational dependencies of the feature extractors. For at least some feature extractors, extractor defining data, comprising extractor data and computational dependencies of the graph node in the dependency graph are determined, and a node lookup key based on the extractor defining data is computed. When the node lookup key is associated with a stored set of output feature values, the stored set is assigned as output values of the feature extractor. When node lookup key is not associated with a stored set of output feature values, a new set of output feature values is computed, stored, and associated the node lookup key. The one set of output feature values are sent as an output feature set.

3 Claims, 3 Drawing Sheets

(56) References Cited

U.S. PATENT DOCUMENTS

| | | | |
|---|---|---|---|
| 2008/0154820 A1* | 6/2008 | Kirshenbaum | G06K 9/6292 706/20 |
| 2009/0157572 A1* | 6/2009 | Chidlovskii | G06N 99/005 706/12 |
| 2009/0281981 A1* | 11/2009 | Chen | G06K 9/6282 706/56 |
| 2011/0276603 A1 | 11/2011 | Bojanic et al. | |
| 2012/0084235 A1* | 4/2012 | Suzuki | G06N 99/005 706/12 |
| 2012/0317149 A1* | 12/2012 | Jagota | G06F 17/30584 707/798 |
| 2014/0250045 A1* | 9/2014 | Bounouane | G06F 17/2765 706/52 |
| 2014/0250047 A1* | 9/2014 | Bounouane | G06F 17/2765 706/52 |
| 2014/0279762 A1* | 9/2014 | Xaypanya | G06N 3/08 706/12 |
| 2015/0242759 A1 | 8/2015 | Bruillard et al. | |

* cited by examiner

MODULAR MEMOIZATION, TRACKING AND TRAIN-DATA MANAGEMENT OF FEATURE EXTRACTION

BACKGROUND

The present invention relates to the field of machine learning, and specifically to the process of feature extraction.

Feature extraction is a step in a machine learning analysis, pattern recognition, image processing, and the like. A feature is a property, usually numeric, of an item in a cohort, such as a property of a subject in a cohort. For example, year-of-birth, height, gender, etc. A feature extraction process may start with initial set of "raw" data (e.g. a database of medical health records, measured data, and/or the like) and derives vectors/sets/matrices of values, called features, to be used by subsequent machine learning analysis steps and the like. Feature extraction may intend to reduce data to be informative and non-redundant, facilitating the subsequent learning and generalization steps, image processing methods, and in some cases leading to better human interpretations. Constructing and identifying features for a specific machine learning application (e.g. predicting the onset of congestive heart failure) using domain knowledge may be termed feature engineering.

For example, when the input data is collected over time, with potentially different number of measured attributes (e.g. lab tests) per each sample (e.g. patient), then it is transformed into a fixed-length set of features. This example process is called feature extraction. The extracted features may contain the relevant information from the input data, so that the desired task may be performed by using a reduced representation instead of the complete input data, which may be large in some cases.

Feature extraction may be performed for a set of items for analysis, called input data or a "cohort". For example, a cohort may contain patients that appear in a medical database, a file, a storage medium, and/or the like. As used herein the term storage medium or medium means any form of non-transitory computer-readable storage medium, such as an internal hard disk, an external hard disk, a remote external hard disk, a network attached hard disk, a network-based cloud storage medium, and/or the like. Machine learning analysis may involve several, possibly overlapping cohorts. Examples of such cohorts: cohort 1—all patients; cohort 2—all patients having at least one diagnosis of diabetes; cohort 3—all patients having at least one diagnosis of diabetes excluding pregnant women; and the like.

The output of a feature extraction process is a feature matrix, a concatenation of feature vectors for cohort items.

Feature extraction, and feature engineering in particular, may involve multiple iterations of exploring, modifying, and tuning the set of computed features. For example, in a machine learning analysis to build an accurate prediction model, say for the onset of congestive heart failure, feature extraction may be run multiple times to identify the features that result in more accurate predictions.

Machine learning analysis is often conducted in two phases: a train phase and an apply phase. For example, during a train phase, a prediction model may be fit to the data, and during an apply phase this model may be used for making predictions from new data.

Data analysis may involve investigating the complete cohort or various sub-cohorts. For example, a common technique in machine learning for assessing the accuracy or robustness of a method is to apply the machine learning algorithm multiple times to sub-cohorts derived from the original cohort using sampling. For example, in k-fold cross-validation analysis, the analysis is applied k times on k different partitions of the original cohort into train and test cohorts. In bootstrapping, the analysis is repeated several times on different sampling of the data, possibly with repetitions. In both cases, the analyzed cohorts are composed of items of the original cohort.

Memoization is an optimization technique for speeding up computer programs. Briefly, it stores the results of time-consuming function-calls and returns the cached results when the function is called again with the identical inputs. A naïve memoization that, for every new input, runs the function and subsequently caches its output may be inefficient in terms of time and space. For example, consider a symmetric function $f(x)$, i.e. $f(x)=f(-x)$. A memoization that computes f for both x and $-x$, and stores the two identical values $f(x)$ and $f(-x)$ is inefficient in terms of time and space. A more efficient memoization makes use of f's symmetry and computes $f(-x)$ for negative x. Thus, utilizing properties of the memoized function may improve memoization efficiency.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with some embodiments, a method comprising using one or more hardware processors for receiving one or more electronic documents representing a dependency graph comprising feature extractors at each graph node and directed edges corresponding to computational dependencies of the feature extractors. For at least some feature extractors, the hardware processor(s) are used for determining extractor defining data, comprising extractor data and computational dependencies of the graph node in the dependency graph, and computing a node lookup key based on the extractor defining data. When the node lookup key is associated with a stored set of output feature values, the stored set is assigned as output values of the feature extractor, where a non-transitory computer-readable storage medium has stored therein previously-computed node lookup keys and associated previously-computed stored sets. When node lookup key is not associated with a stored set of output feature values, the hardware processor(s) are used for computing a new set of output feature values and storing the new set on the non-transitory computer-readable storage medium and associating the node lookup key with the new set. The hardware processor(s) are used for sending one set of output feature values as an output feature set of the dependency graph.

In some embodiments, the extractor defining data comprises one or more child node lookup keys.

In some embodiments, the output feature values comprise one or more members from a group consisting of metadata names, metadata types, and metadata descriptions.

In some embodiments, the extractor data comprises one or more members from a group consisting of an extractor class, extractor parameters, a cohort class, cohort parameters, and a cohort index-list.

In some embodiments, the dependency graph comprises a root node defining the output feature set.

In some embodiments, the input data to the dependency graph comprises a known outcome data, and the input data and known outcome data are operable to train a machine learning model.

In some embodiments, the node lookup key is computed further based on two or more previously-computed lookup keys.

There is provided, in accordance with some embodiments, a computer program product comprising a non-transitory computer-readable storage medium having program code embodied therewith, the program code being executable by one or more hardware processors. The program code comprises instructions to receive one or more electronic documents representing a dependency graph comprising feature extractors at each graph node and directed edges corresponding to computational dependencies of the feature extractors. For at least some feature extractors, the program code comprises instructions to determine extractor defining data, comprising extractor data and computational dependencies of the graph node in the dependency graph, and compute a node lookup key based on the extractor defining data. When the node lookup key is associated with a stored set of output feature values, the stored set is assigned as output values of the feature extractor, wherein the non-transitory computer-readable storage medium has stored therein previously-computed node lookup keys and associated previously-computed stored sets. When node lookup key is not associated with a stored set of output feature values, the program code comprises instructions to compute a new set of output feature values and storing the new set on the non-transitory computer-readable storage medium and associate the node lookup key with the new set. The program code comprises instructions to send one set of the output feature values as an output feature set of the dependency graph.

In some embodiments, the extractor data comprises one or more child node extractor lookup keys.

In some embodiments, the output feature values comprise one or more members from a group consisting of metadata names, metadata types, and metadata descriptions.

In some embodiments, the extractor data comprises one or more members from a group consisting of an extractor class, extractor parameters, a cohort class, cohort parameters, and a cohort index-list.

In some embodiments, the dependency graph comprises a root node defining the output feature set.

In some embodiments, the input data to the dependency graph comprises a known outcome data, and the input data and outcome data are operable to train a machine learning model.

In some embodiments, the node lookup key is computed further based on a two or more of previously-computed lookup keys.

There is provided, in accordance with some embodiments, a computerized system, comprising a non-transitory computer-readable storage medium having stored thereon program code. The program code comprises instruction for receiving one or more electronic documents representing a dependency graph comprising feature extractors at each graph node and directed edges corresponding to computational dependencies of the feature extractors. For at least some feature extractors, the program code comprises instruction for determining extractor defining data, comprising extractor data and computational dependencies of the graph node in the dependency graph, and computing a node lookup key based on the extractor defining data. When the node lookup key is associated with a stored set of output feature values, the stored set is assigned as output values of the feature extractor, wherein the non-transitory computer-readable storage medium has stored therein previously-computed node lookup keys and associated previously-computed stored sets. When node lookup key is not associated with a stored set of output feature values, the program code comprises instruction for computing a new set of output feature values and storing the new set on the non-transitory computer-readable storage medium and associating the node lookup key with the new set. The program code comprises instruction for sending one set of output feature values as an output feature set of the dependency graph. The computerized system comprises one or more hardware processors configured to execute the program code.

In some embodiments, the extractor defining data comprises one or more child node extractor identification values.

In some embodiments, the output feature values comprise one or more members from a group consisting of metadata names, metadata types, and metadata descriptions.

In some embodiments, the extractor data comprises one or more members from a group consisting of an extractor class, extractor parameters, a cohort class, cohort parameters, and a cohort index-list.

In some embodiments, the dependency graph comprises a root node defining the output feature set.

In some embodiments, input data to the dependency graph comprises a known outcome data, and the input data and outcome data are operable to train a machine learning model.

In some embodiments, the node lookup key is computed further based on two or more previously-computed lookup keys.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are provided system, methods, and computer program products for memoization of feature extraction results. The input is a description of an extractors graphs, such as a dependency graph of feature extractors with no circular dependencies. The system determines extractor defining data (EDD) for at least some feature extractors, where the EDD incorporates information affecting the output feature vector(s), such as the cohort, the child extractor nodes it depends on, the feature extraction function, the extraction code, the parameter values of the extractor, and/or the like. The determined EDDs are used for identifying the extractors' output features: identical EDDs imply identical output features.

The system may use look-up tables to map EDD elements to look-up keys. For example, the system may use: a cohort table to map cohort defining data to a look-up key (COHORT_LK), a class table to map class defining data to a look-up key (CLASS_LK), a parameters table to map the parameter set to a look-up key (PARAMS_LK), and the like. Similarly, the EDD may be mapped to an extractor lookup key (ELK) and EDD to ELK is a one-to-one mapping and, hereafter, these terms are used interchangeably. As used herein, the term lookup key or LK means any type of lookup key, the term extractor lookup key or ELK means the lookup key of the node or extractor, and the terms CLASS_LK, COHORT_LK, PARAMS_LK, and the like mean the lookup key for individual look-up table entries. Storing the extracted feature results of each node in an extractor-features table with the respective ELK allows reusing previously computed output features for at least some nodes in future feature extraction processes.

For example, a dependency graph is received and some nodes may be analyzed. The extractor defining data for the analyzed nodes may comprise the node extraction function, the node extraction parameters, the cohort, children nodes, and the like. The extractor defining data (EDD) may be determined for the node, and a node extractor lookup key (ELK) may be computed. The ELK may be computed by locating some of the data elements of the EDD in the respective lookup tables, such as looking up a cohort defining data in the cohort table, looking up a parameter set in the parameter table, and/or the like. When the data element is not found in its corresponding look-up table, a new entry that maps between the data element and a new LK is generated in that table. The LKs of EDD elements are used to check for a match of a given EDD in the extractors table. When such a match is found, the previously computed ELK is used. Otherwise, a new entry that maps the EDD and to a new ELK may be generated and added to the extractors table.

Feature memoization of an extractor node may use the extractor-features table, that maps ELKs to the corresponding node's output features. When the node's ELK is found in the extractor-features table, previously computed features of the corresponding extractor node may be retrieved. If the ELK is not found, a new entry that maps the ELK to the computed output features of the extractor node may be generated and stored in the extractor-features table for future use. Optionally, only certain extractor nodes may be memoized. For example, extractor nodes that require large amounts of storage space, but may be computed quickly may be left out of the extractor-features tables.

As feature extraction is an integral part of machine learning analysis, it may be invoked for each run of the entire machine learning pipeline. A slow feature extraction step may become a bottleneck of a machine learning analysis, limiting the feasibility to explore alternative configurations of the analysis for improving the overall machine learning model accuracy.

A feature extraction process may be viewed as a combination of feature extractors, each producing a feature vector which may be combined to a feature matrix for further analysis. Such a combination of feature extractors may be described in a dependency graph of feature extraction, and each node may represent a feature extractor. A feature extractor may be defined by an input data source, a subset selection information of the input data, an extraction function, extractor parameters, such as parameters of the extraction function, and/or the like. Extractor nodes of an extractors graph may have parameters used to compute features. Every extractor may access a data source, such as a database. The data source may be defined by the node parameters. A node may operate on features computed by other child nodes.

The process of feature extraction may be partitioned into smaller building blocks, such as extractor nodes of a dependency graph (see below), where each block computes one or more feature vectors using the raw data and/or previous computed feature vectors. For example, one block may compute the feature "height"; a second block may compute the feature "weight"; and a third block may compute the feature "body mass index (BMI)", using the results of the two other blocks. Each of these building blocks may be a "feature extractor".

As used herein, the term "extractors graph" means a dependency graph that describes the set of feature extractors and the dependencies between them. The nodes of this graph correspond to feature extractors. Directed edges between the nodes indicate the dependencies between the corresponding extractors. An edge points from a parent node to a child node, designating that the parent node is dependent on the output of the child node. Therefore, the output of a child node needs to be processed before any of its parent nodes. An extractors graph may not contain circular dependencies, thereby considered a directed acyclic graph (DAG). A root node is used to designate the entire feature matrix computed by the extraction process. Specifically, a root node may be used to concatenate the output features of its child nodes into a single matrix of features, which is the output of extraction process defined by this extractors graph. As used herein, the term extractors graph means a directed acyclic graph, and the two terms may be used interchangeably in this application.

The execution of multiple, possibly different, extraction processes on a same or similar cohort, may be enhanced using memoization of extractor node output features, rather than at the level of the entire graph. This modular memoization may allow re-use of previously computed features, and re-computation of only feature vectors that were not previously computed.

The proposed memoization mechanism may also be used for storing and retrieving train-statistics for each node. The extraction of some features may require train-data statistics for computing the features. During train phase, these statistics may be computed, and during apply phase the statistics may be restored for the purpose of computing features from new data. For example, the extraction of indicator features corresponding to the diagnoses observed in the train-data may need to retrieve a list of diagnoses (previously extracted during the train phase) during an apply phase in order to compute the same the set of indicator features. Another example is the computation of the feature height percentile in a train-cohort, which requires statistics on height-percentile boundaries in the train cohort for the purpose of mapping new patient data to the population height percentiles. The system may also use the computed ELKs for storing and retrieving train-statistics for each extractor node using a lookup table that maps ELKs to the corresponding train-statistics. When ELK is found and is associated with previously computed train-statistics, this train-statistics may be retrieved.

The proposed memoization mechanism may also be used for storing and retrieving other data elements that may be associated with the extractor nodes. For example, results of analyzing the output features may be associated with the root extractor node.

The proposed mechanism may be also used for reconstructing the parameters of extractor nodes and the dependencies between them. In particular, given the ELK of a root extractor node, the entire extractors graph can be reconstructed from the corresponding EDD.

Given an input extractors graph, the technique automatically identifies the features that may be computed, and the features that were previously computed and may be retrieved. This modular memoization saves both processing time and storage requirements compared to systems that do not use memoization, or use memoization at the level of entire output matrix. In the case of memoization at the level of the entire matrix, a change in a single feature vector may require computing and storing the entire feature matrix.

Finally, the proposed mechanism may support efficient memoization of multiple feature extraction processes for sub-cohorts derived, for example, by sampling the same cohort. For optimizing the extraction of sub-cohorts derived from an original cohort, the system may receive the list of item-indices, with respect to the original cohort, that defines the sub-cohort. In this case, the system may identify which nodes may be memoized by computing their value for the original cohort, and then deriving the matrix of the sub-cohort using the given indices. For example, the feature height for a sub-cohort with indices $[i_1, i_2, \ldots, i_k]$, may be computed by using the height vector for the original cohort, and then deriving the sub-cohort corresponding to the indices $[i_1, i_2, \ldots, i_k]$. On the other hand, the feature "height percentile" may not be computed in this way, since the train-statistics, and consequently the value for each patient, vary for each selection of sub-cohort.

Figure 1:
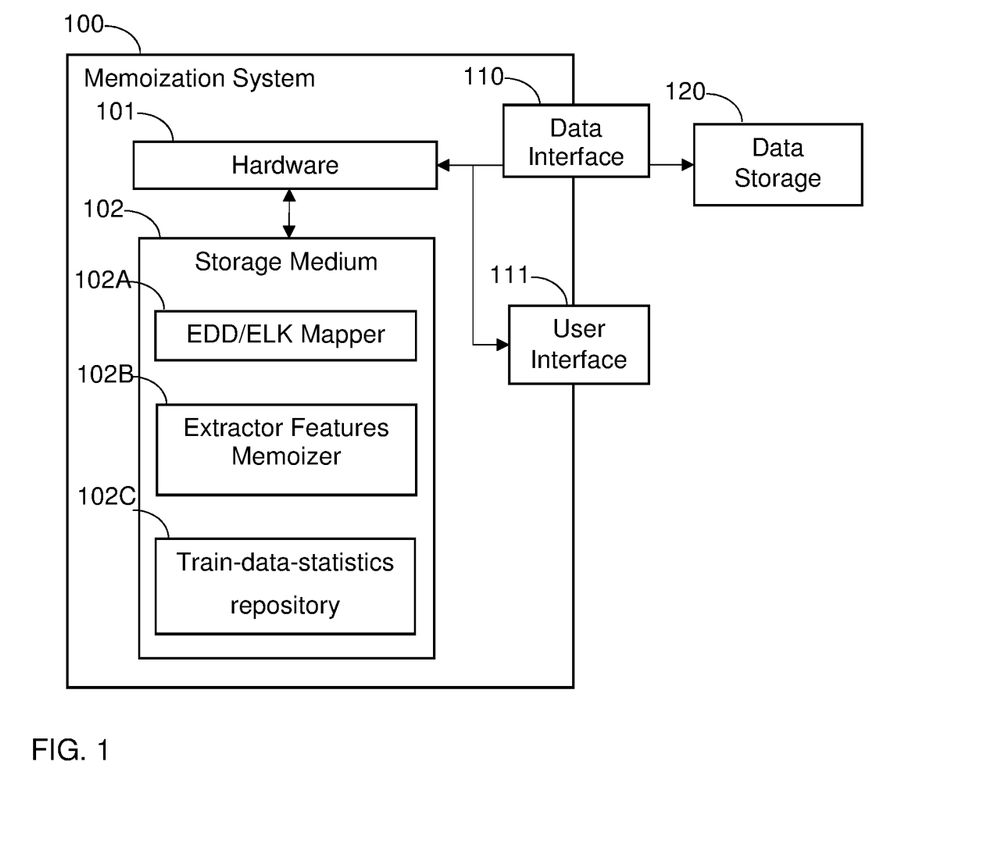
FIG. 1 is a schematic illustration of a computerized system for memoization of feature extractors.
Figure 2:
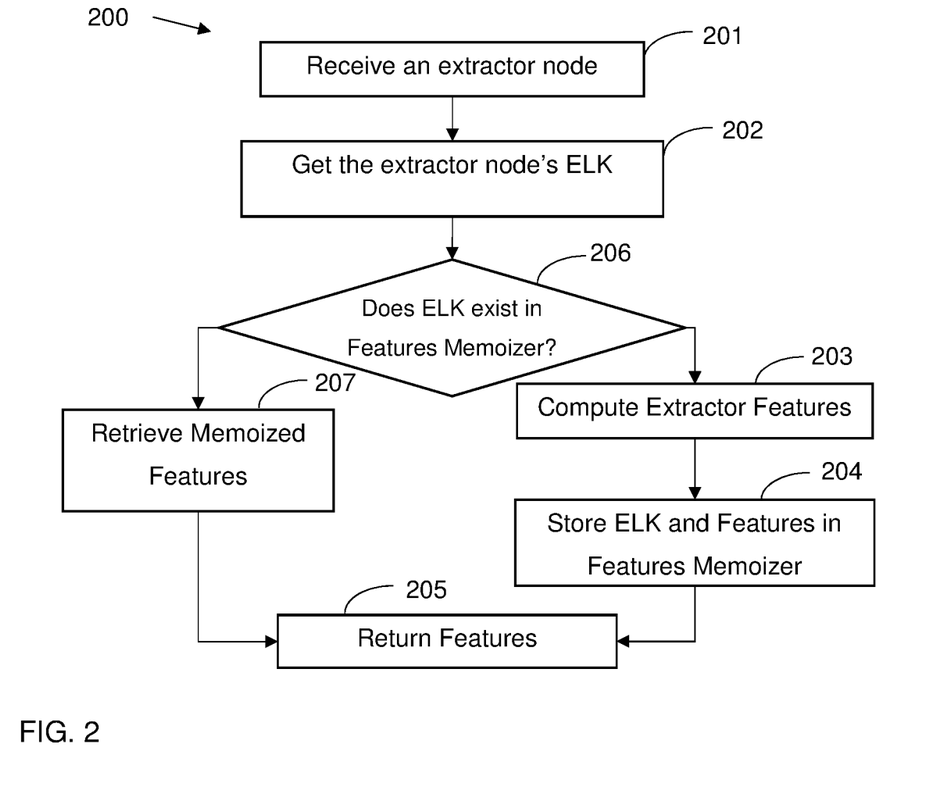
FIG. 2 is a flowchart of a method for memoization of feature extractors.

Reference is now made to FIG. 1 and FIG. 2, which are a schematic illustration of a computerized system 100 and a flowchart 200 of a method, respectively, for memoization, tracking and train-data-statistics management of feature extractors. System 100 comprises one or more hardware processors 101 for executing program code retrieved from a non-transitory computer-readable storage medium 102. Special program code on medium 102 comprises an EDD/ELK Mapper 102A for receiving 201 an extractors graph of feature extractors from a user interface 111, a data interface 110, non-transitory computer-readable storage medium 102, and/or the like, and automatically determining for the extractors graph unique extractor defining data (EDD) and the corresponding extractor lookup key (ELK) that may represent the feature extractor of that node, and feature extractors, data parsers, subset selectors, and/or the like, of the child nodes in the extractors graph to that node. The EDD may contain the feature mathematical function, the feature type, the parameters to the extractor, the child node list, and/or the like. The EDD uniquely identifies the features extracted at the node.

The extractors graph may be processed, checking if a node ELK exists 206 in a database, file, non-transitory computer-readable storage medium 102, attached data storage 120, and/or the like of previously extracted features. As used herein the term database is used to designate a non-transitory computer-readable storage medium 102, attached data storage 120, and/or the like, which may be means to store data accessible by hardware processor(s) 101. For example, Extractor Features Memoizer 102B is operable to automatically search for the same ELK in a database of feature extractor results. When a matched ELK is found, the previously computed node features are automatically retrieved 207 by hardware processor(s) 101, such that the matched nodes of the extractors graph do not need to be processed.

ELKs of nodes that need to be memoized and the extractor feature memoizer 102B do not find in the extractor-features table, such as new nodes of the extractors graph that where not yet computed, are automatically computed 203 by hardware processor(s) 101, and the resulting new features are automatically stored 204 in the extractor-features table by the extractor feature memoizer 102B and returned 205 as output.

For example, the extractors graph is processed by the computer processor, to retrieve application data from attached data storage 120 through a data interface, such as a network interface. The application data may be retrieved as input to compute 203 features according to the extractors graph by hardware processor(s) 101. Extractor Features Memoizer 102B comprises processor instructions operable to automatically store 204 the results of at least some nodes' resulting features with the respective EDD in a database on storage medium 102, Train-data-statistics repository 102C, attached data storage 120, and/or the like.

Following are further details of the extractors graph, feature extractors, EDD computations, memoization, and/or the like.

The data from which features are extracted may be very complex, containing numerous data entities organized in various types of tables. For example, electronic medical records (EMR) may contain information on patients' demographics, diagnoses, lab test results, medical procedures, drug prescriptions, hospitalizations, and/or the like, in different time points. Optionally, different data types may require different extraction methods for producing relevant features. For example, longitudinal data, such as measurement data from multiple events at different time points, may be aggregated to summarize a sequence of measurements into a single value. For example, each patient in a medical database may have different number of weight measurements: some may have none; some may have several at different time-points. Weight measurement per patient may be aggregated by using functions like: mean, median, max, min, standard deviation, and/or the like. There are many alternative aggregation methods, and each may capture different aspect of the data.

The complexity of machine learning input data may lead to the extraction of numerous feature vectors. A machine learning analysis may wish to test models with inclusion and/or exclusion of certain feature subsets. Additional alternative configurations of the extraction process may be tested, such as changing the length of the observation period, changing the aggregations used, such as from mean to median, adding new extractors, such as standard deviation, and/or the like. Different alternative cohorts may be tested in machine learning analysis. For example, excluding a sub-cohort of patients suspected as outliers may be performed.

Different configurations of the extraction process may lead to non-identical but largely overlapping output features. The existence of multiple alternative extraction processes whose output matrices share common feature vectors makes it hard to manually track the different configurations and efficiently memoize the results.

Figure 3:
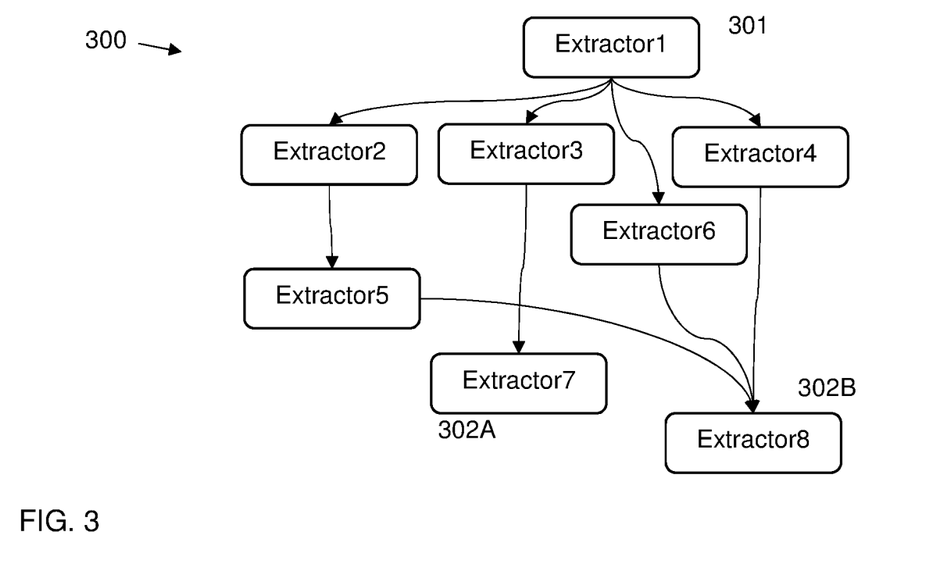
FIGS. 3-5 are schematic illustrations of extractors graphs.

Reference is now made to FIG. 3, which is a schematic illustration of a first extractors graph 300. Graph 300 is a graph of machine learning feature extractors, one at each node. Extractors graph 300 has a single root node 301, which produces a feature matrix for further statistical analysis and/or processing. The leaves 302A and 302B may each compute one or more feature vectors. For example, one node may compute the average value of some lab tests during a predefined observation period, and the other may extract the percentiles of some variables, based on their distribution in the same or different population.

The extractors graph may be described by an input Extensible Markup Language (XML). Extractors may be defined by XML tags. Parent-child dependencies may be represented either by nested tags, or using cross-references, e.g. using XML attributes ID/IDREF. Parameters may be also defined by XML tags under each extractor tag. The definition of an extractor may also include the name of the class and/or code that is used for the computation of features.

The computation of an EDD of an extractor node may include the following: class/code identifier, the actual parameters used by the code, the cohort, and the ELKs of the child-extractors (if exist). LKs may be identifying numbers that are serially assigned to data objects for mapping between features and EDDs. Changes in any of the above may lead to a change in the EDD computed for the node. Thus, when two nodes, such as in two different extractors graphs, have the same EDD and, consequently, the same ELK, these two nodes are also expected to have the same output features. Following is a sample code for an extractors graph:

```
<?xml version="1.0" encoding="UTF-8"?>
<root>
    <cohort class="FraminghamCohort"/>
    <groupExtractor id="all_features">
        <extractor id="smoking" class="SmokingExtractor" />
        <extractor id="common_dx" class="CommonDxExtractor" >
            <params>
                <param name="min_prevalence" value="0.05"/>
            </params>
        </extractor>
        <transformExtractor class="InteractionExtractor"
            id="common_dx*smoking">
            <copyExtractor idref="common_dx"/>
            <copyExtractor idref="smoking"/>
        </transformExtractor>
    </groupExtractor>
</root>
```

Figure 4:
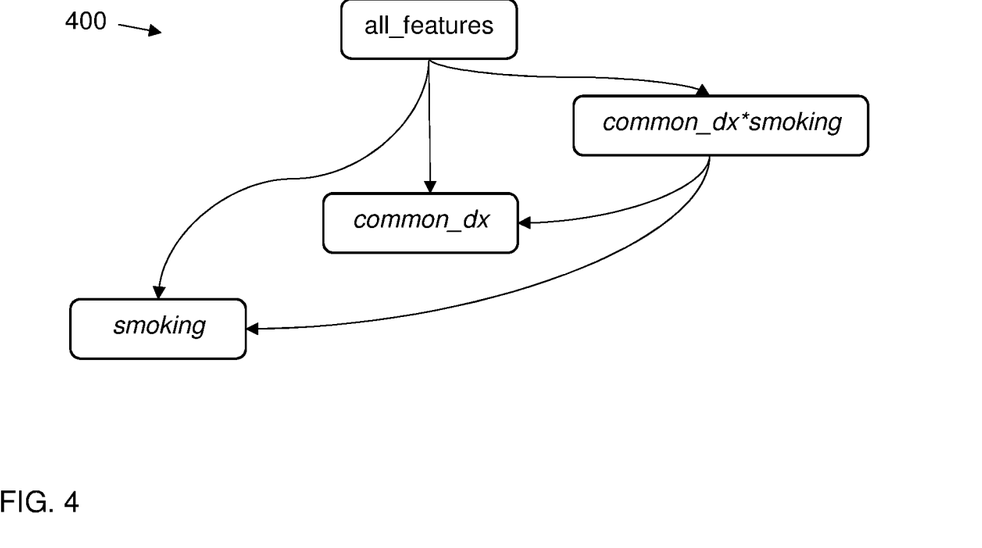

Reference is now made to FIG. 4, which is a schematic illustration of a second extractors graph 400. Graph 400 shows a graphic illustration of the above code.

The computation of extractor EDDs may involve several look-up tables that map EDD components using LKs, e.g. LKs of cohorts, parameters, classes, and the like, to the corresponding stored output feature values. For example, each table contains one or more auto-incremented integer column, such as a lookup key column, that is automatically incremented for each new row that is added. The remaining columns in each table may be information columns. A table of CLASSES may comprise a NAME field, a Version field, and/or the like. A table of PARAMS may comprise one or more CONTENT fields, such as normalized serialization of a parameter set. A table of COHORTS may comprise a CLASS_LK field, a PARAMS_LK field, such as the parameter set used by the cohort extractor, a Sub-cohort index list and/or its hashcode, and/or the like. A table of EXTRACTORS may comprise a CLASS_LK field, a PARAMS_LK field, such as for the parameter set used by the feature extractor, a COHORT_LK field, a list of child extractor node ELKs, and/or the like.

Changing the extractors graph, for example by changing the values of some of the parameters, may change the EDDs of the nodes whose features may be affected by these changes, either directly, or indirectly—by another child-node that is affected. Nodes that are not affected by the change remain with the same EDDs. This modularity may enable incremental extraction of features, where previously computed node results are retrieved from storage, and newly generated node results are stored for future reuse. Storage space may also by smaller compared to storing the entire results for each run.

A storage repository, such as a database, may allow tracking of data associated with each extractor lookup key, such as parameters, output features, computed context data, and/or the like.

The computed ELKs are also used to identify an extractor's train-statistics—during train phase, where train-statistics is stored in association with the ELK, and during apply phase—for the purpose of retrieving the train-statistics from the Train-data-statistics repository 102C.

A feature may be context-sensitive when the feature value for an item may change when it is included in different cohorts. For example, the feature "height-percentile" is context-sensitive, since a patient is likely to have different height percentile when included in a cohort of tall patients (e.g. NBA players) compared to a cohort of short patients (e.g. children under the age of 12). A feature value for a given item that is unaffected by the cohort is called "context-insensitive". An example for context-insensitive feature is "height": the height of a person is clearly unaffected by the height of the other individuals in his cohort.

A feature extractor is said to be context-sensitive if at least one of the features it computes is context-sensitive. Otherwise it is said to be context-insensitive. The memoization process makes a distinction between context-sensitive and context insensitive nodes: for the context-insensitive features memoization may be made more efficient by generating, storing and loading results for the entire cohort, and then deriving the sub-cohort results.

The EDDs may enable optimizing the time and storage space of sub-cohort extraction, such as during cross-validation and bootstrapping, for nodes that are context-insensitive. In this example, context-insensitive node results may be extracted and stored, or retrieved from storage for the original cohort. Then the features for the sub-cohort may be derived from the stored features. In the first time feature extraction is invoked for a sub-cohort, the features corresponding to the entire original cohort may be computed and stored for each context-insensitive extractor. For example, during cross validation, in the processing of the first fold, the entire content of context-insensitive extractors may be generated and stored, and for subsequent processing runs, results may be retrieved from storage.

An extractor becomes context-sensitive if any of its child-nodes is context-sensitive. For example, the node that computes transformation on the output of other nodes, such as $x \Rightarrow x^2$, $x,y \Rightarrow x*y$ (interactions) may become context-sensitive if the features that it depends on are context-sensitive.

Finally, the system allows the user to decide which extractors may be memoized and which may not. The optimization for a context-insensitive extractor may be made only if (1) the extractor is memoized, or (2) any of its ancestors is context-insensitive and memoized, and thus requires the features corresponding to the original cohort from its children. If these two conditions are not satisfied, then the extraction is made directly for the specific sub-cohort and not the original cohort.

Following is an example of pseudo-code for feature extractor memoization. The first procedure, setExtractorContextSensitiveStatus, computes and sets whether an extractor node is context-sensitive using the following rule: an extractor node is context-sensitive if its own operation is context-sensitive, or if any of its children are context-sensitive. The second procedure, setExtractorCohort, computes and sets for each extractor node whether it should be computed on the complete cohort, or a sub-cohort of it. The procedure follows the following rule: an extractor node should generate features for the complete cohort if either (1) no sub-cohort is specified, or (2) the extractor node is context-insensitive, and the extractor node is memoized, or at least one of the extractor node's parents should generate features for the complete cohort. The last procedure, setExtractorLK, computes and sets the ELK of each extractor.

Example code:

For example, extracting features using two extractors graphs, each stored in an XML file, such as XML1 and XML2, the computed EDDs for at least some nodes of each extractors graph are given below:

```
XML1:
    <root>
        <cohort class="FraminghamCohort"/>
        <groupExtractor id="all_features">
            <extractor class="ExtractorA" id="a">
                <params>
                    <numericParam name="T" value="0.05"/>
                </params>
            </extractor>
            <extractor class="ExtractorB" id="b"/>
        </groupExtractor>
    </root>
```

```
PROCEDURE setExtractorContextSensitiveStatus(extractorNode) {
    IF extractorNode.isContextSensitive was already set RETURN;
    // recursive calls for children
    FOREACH childExtractor IN extractorNode.children
        setExtractorContextSensitiveStatus(childExtractor);
    // setting status based on operation and children
    IF extractorNode.isContextSensitiveOperation( )
        extractorNode.isContextSensitive = TRUE;
    ELSE {
        extractorNode.isContextSensitive = FALSE;
        FOREACH extractorChild IN extractorNode.children
            IF extractorChild.isContextSensitive {
                extractorNode.isContextSensitive = TRUE;
                BREAK;
            }
    }
}
PROCEDURE setExtractorCohort(extractorNode) {
  IF any of extractorNode's parents does not have its cohort defined
      // equivalent to checking that the procedure was called less than
#extractorNode.parents for the current extractorNode
      RETURN;
  IF subCohort IS NULL
      extractorNode.cohort = completeCohort;
  ELSE IF extractorNode.isContextSensitive
      extractorNode.cohort = subCohort;
  ELSE IF extractorNode.isMemoized
      extractorNode.cohort = completeCohort;
ELSE {
// extractorNode is NOT memoized - no need to extract the complete cohort
//   - unless one of its parents requires the complete cohort
// (this could happened only if the parent or any of its ancestors are memoized)
      extractorNode.cohort = subCohort;
      FOREACH parentExtractor IN extractorNode.parents
          IF parentExtractor.cohort == complete Cohort {
              extractorNode.cohort = completeCohort;
              BREAK;
          }
   }
    FOREACH childExtractor IN extractorNode.children // recursive call (top-down)
        setExtractorCohort(childExtractor);
PROCEDURE setExtractorLK(extractorNode) {
    IF extractorNode.ELK was previously set
        RETURN;
    // get ELKs of child extractors
    childrenELKs = [ ];
    FOREACH childExtractor IN extractorNode.children {
        setExtractorLK(childExtractor); // recursive call
        childrenELKs = [childrenELKs, childExtractor.ELK];
    }
    extractorNode.ELK=computeLK(extractorNode.getClassLK( ),
                    extractorNode.params.getLK( ),
                    extractorNode.cohort.getLK( ),
                    childrenELKs,
                    extraLKs);
            // extraLKs may the LK of any additional entities that affect the
    output features of the extractorNode, e.g. the engine's code.
}
```

-continued

```
XML2:
  <root>
    <cohort class="FraminghamCohort"/>
    <groupExtractor id="all_features">
      <extractor class="ExtractorA" id="a">
        <params>
          <numericParam name="T" value="0.01"/>
        </params>
      </extractor>
      <extractor class="ExtractorB" id="b"/>
    </groupExtractor>
  </root>
```

Figure 5:
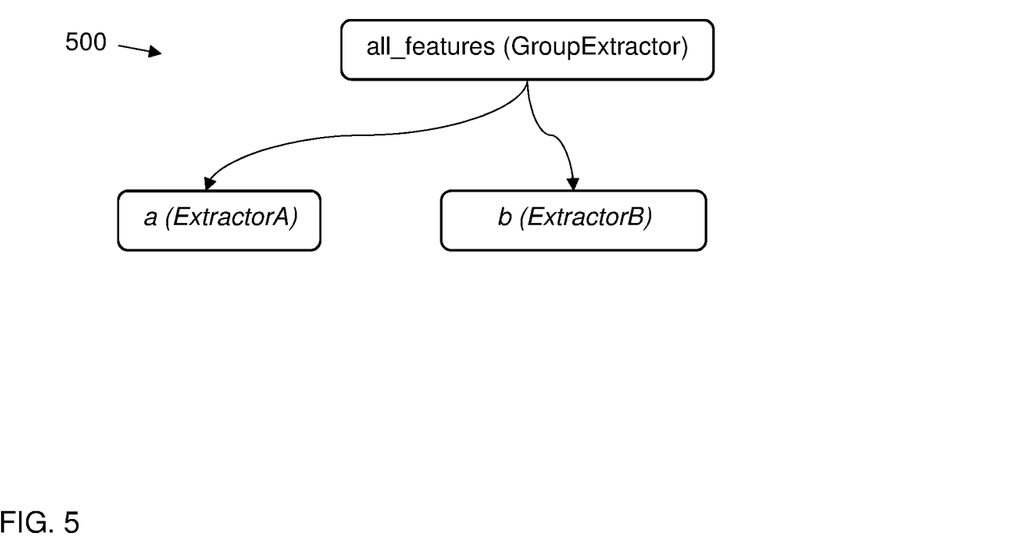

Reference is now made to FIG. 5, which is a schematic illustration of a third extractors graph 500. Graph 500 shows a graphic illustration of the above code.

Computing EDDs for these two XML files may produce the following tables.

TABLE 1

PARAMETERS table

| PARAMS_LK | Content |
|---|---|
| 1 | { } |
| 2 | {T = 0.05} |
| 3 | {T = 0.01} |

TABLE 2

CLASSES table

| CLASS_LK | Name | Version |
|---|---|---|
| 1 | FramighamCohort | 1.0 |
| 2 | GroupExtractor | 1.0 |
| 3 | ExtractorA | 1.0 |
| 4 | ExtractorB | 1.0 |

TABLE 3

COHORTS table

| COHORT_LK | CLASS_LK | PARAMS_LK | SUB-COHORT_INDICES |
|---|---|---|---|
| 1 | 1 | 1 | NULL |

TABLE 4

EXTRACTORS table

| ELK | CLASS_LK | PARAMS_LK | COHORT_LK | CHILD_ELKS |
|---|---|---|---|---|
| 1 | 3 | 2 | 1 | [ ] |
| 2 | 4 | 1 | 1 | [ ] |
| 3 | 2 | 1 | 1 | [1, 2] |
| 4 | 3 | 3 | 1 | [ ] |
| 5 | 2 | 1 | 1 | [4, 2] |

In this example, ELK 1, 2, and 3 are added to the EXTRACTORS table when processing XML1, and ELK 4 and 5 are added when processing XML2. Processing XML2 also uses the previously computed ELK 2 from the EXTRACTORS table.

Following is an example of a sequential query language (SQL) command for creating an entry in EXTRACTORS table for an extractor, when such does not exist:

MERGE INTO EXTRACTORS t
USING (VALUES (?,?,?,?)) AS
  cur(CLASS_LK, PARAMS_LK, COHORT_LK, DESCENDANT_EXTRACTOR_LKS)
ON cur. CLASS_LK=t. CLASS_LK AND
  cur.PARAMS_LK=t.PARAMS_LK AND
  cur. COHORT_LK=t. COHORT_LK AND
  cur.DESCENDANT_EXTRACTOR_LKS= t.DESCENDANT_EXTRACTOR_LKS
WHEN NOT MATCHED
THEN INSERT (CLASS_LK, PARAMS_LK, COHORT_LK, DESCENDANT_EXTRACTOR_LKS) VALUES (?,?,?,?)
ELSE IGNORE After this command, the extractor EDD may be retrieved by the following SQL command:

SELECT ELK FROM EXTRACTORS WHERE CLASS_LK=? AND PARAMS_LK=? AND COHORT_LK=? AND DESCENDANT_EXTRACTOR_LKS=?

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for, in a feature extraction step of a machine learning analysis:

receiving at least one electronic document representing a dependency graph comprising feature extractors at each graph node and directed edges corresponding to computational dependencies of the feature extractors, wherein each of the feature extractors is configured to reduce data to be informative and non-redundant, by deriving vector values or matrix values from the data;

for at least some of said feature extractors:

i) determining extractor defining data, the extractor defining data comprising: extractor data and computational dependencies of said graph node in said dependency graph, wherein the extractor data are selected from the group consisting of: an extractor class, an extractor parameter, a cohort class, a cohort parameter, and a cohort index list;

ii) computing a node lookup key based on said extractor defining data, wherein, when the feature extractor is context-insensitive—the node lookup key is for an entire cohort, wherein a context-insensitive feature extractor is a feature extractor which computes an identical value for a same sample in the sub-cohort and in the entire cohort;

iii) when the node lookup key is not associated with node features that are stored on a non-transitory computer-readable storage medium: computing new node features, storing said new node features on said non-transitory computer-readable storage medium, and associating said node lookup key with said new node features;

iv) when the feature extractor is context-sensitive, or when the feature extraction step is directed to the entire cohort: retrieving said node features or said new node features from said non-transitory computer-readable storage medium, wherein a context-sensitive feature extractor is a feature extractor which computes a different value for a same sample in the sub-cohort and in the entire cohort;

v) when the feature extractor is context-insensitive and the feature extraction step is directed to a sub-cohort: deriving a feature of the sub-cohort from the node features or the new node features of the entire cohort without recomputing the feature for the sub-cohort; and sending at least some of said node features or new node features as an output set of said dependency graph, thereby accelerating the feature extraction step of the machine learning analysis.

2. A computer program product comprising a non-transitory computer-readable storage medium having program code embodied therewith, the program code being executable by at least one hardware processor to, in a feature extraction step of a machine learning analysis:

receive at least one electronic document representing a dependency graph comprising feature extractors at each graph node and directed edges corresponding to computational dependencies of the feature extractors, wherein each of the feature extractors is configured to reduce data to be informative and non-redundant, by deriving vector values or matrix values from the data;

for at least some of said feature extractors:

i) determine extractor defining data, the extractor defining data comprising extractor data and computational dependencies of said graph node in said dependency graph, wherein the extractor data are selected from the group consisting of: an extractor class, an extractor parameter, a cohort class, a cohort parameter, and a cohort index list;

ii) compute a node lookup key based on said extractor defining data, wherein, when the feature extractor is context-insensitive—the node lookup key is for an entire cohort, wherein a context-insensitive feature extractor is a feature extractor which computes an identical value for a same sample in the sub-cohort and in the entire cohort;

iii) when the node lookup key is not associated with node features that are stored on a non-transitory computer-readable storage medium: computing new node features, storing said new node features on said non-transitory computer-readable storage medium, and associating said node lookup key with said new node features;

iv) when the feature extractor is context-sensitive, or when the feature extraction step is directed to the entire cohort: retrieve said node features or said new node features from said non-transitory computer-readable storage medium, wherein a context-sensitive feature extractor is a feature extractor which computes a different value for a same sample in the sub-cohort and in the entire cohort;

v) when the feature extractor is context-insensitive and the feature extraction step is directed to a sub-cohort: deriving a feature of the sub-cohort from the node features or the new node features of the entire cohort without recomputing the feature for the sub-cohort; and send at least some of said node features or new node features as an output set of said dependency graph, thereby accelerating the feature extraction step of the machine learning analysis.

3. A computerized system, comprising:

(a) a non-transitory computer-readable storage medium having stored thereon program code for, in a feature extraction step of a machine learning analysis:

receiving at least one electronic document representing a dependency graph comprising feature extractors at each graph node and directed edges corresponding to computational dependencies of the feature extractors, wherein each of the feature extractors is configured to reduce data to be informative and non-redundant, by deriving vector values or matrix values from the data;

for at least some of said feature extractors:

(i) determining extractor defining data, the extractor defining data comprising extractor data and computational dependencies of said graph node in said dependency graph, wherein the extractor data are selected from the group consisting of: an extractor class, an extractor parameter, a cohort class, a cohort parameter, and a cohort index list;

(ii) computing a node lookup key based on said extractor defining data, wherein, when the feature extractor is context-insensitive—the node lookup key is for an entire cohort, wherein a context-insensitive feature extractor is a feature extractor which computes an identical value for a same sample in the sub-cohort and in the entire cohort;

(iii) when the node lookup key is not associated with node features that are stored on a non-transitory computer-readable storage medium: computing new node features, storing said new node features on said non-transitory computer-readable storage medium, and associating said node lookup key with said new node features;

(iv) when the feature extractor is context-sensitive, or when the feature extraction step is directed to the entire cohort: retrieving said node features or said new node features from said non-transitory computer-readable storage medium, wherein a context-sensitive feature extractor is a feature extractor which computes a different value for a same sample in the sub-cohort and in the entire cohort;

(v) when the feature extractor is context-insensitive and the feature extraction step is directed to a sub-cohort: deriving a feature of the sub-cohort from the node features or the new node features of the entire cohort without recomputing the feature for the sub-cohort; and sending at least some of said node features or new node features as an output set of said dependency graph, and (b) at least one hardware processor configured to execute said program code, thereby accelerating the feature extraction step of the machine learning analysis.

* * * * *